(12) United States Patent
Scharf et al.

(10) Patent No.: US 9,288,945 B2
(45) Date of Patent: Mar. 22, 2016

(54) BALER

(71) Applicant: USINES CLAAS FRANCE S.A.S., Metz (FR)

(72) Inventors: Thorsten Scharf, Orscholz (DE); Ulrich Hesselmann, Perl (DE)

(73) Assignee: USINES CLAAS FRANCE S.A.S., Metz (FR)

( * ) Notice: Subject to any disclaimer, the term of this patent is extended or adjusted under 35 U.S.C. 154(b) by 0 days.

(21) Appl. No.: 13/764,953

(22) Filed: Feb. 12, 2013

(65) Prior Publication Data
US 2013/0206019 A1    Aug. 15, 2013

(30) Foreign Application Priority Data
Feb. 15, 2012  (DE) .................. 10 2012 002 796

(51) Int. Cl.
*A01F 15/12*    (2006.01)
*A01F 15/14*    (2006.01)

(52) U.S. Cl.
CPC ............... *A01F 15/12* (2013.01); *A01F 15/145* (2013.01)

(58) Field of Classification Search
CPC ................................ A01F 15/12; A01F 15/145
USPC ....... 100/34, 912, 8, 33 R; 206/394; 242/129, 242/141, 146, 594.3, 594.2
See application file for complete search history.

(56) References Cited

U.S. PATENT DOCUMENTS

| | | | | |
|---|---|---|---|---|
| 1,731,347 | A * | 10/1929 | Milosewicz | 242/137.1 |
| 2,458,318 | A * | 1/1949 | Tuft | 242/560 |
| 2,477,059 | A * | 7/1949 | Hill | 242/137.1 |
| 2,879,709 | A * | 3/1959 | Nelson et al. | 100/4 |
| 5,072,667 | A * | 12/1991 | Yeardley | 100/3 |
| 5,718,365 | A * | 2/1998 | Palmer | 225/38 |
| 5,996,307 | A * | 12/1999 | Niemerg et al. | 53/118 |
| 6,857,251 | B2 * | 2/2005 | McClure et al. | 53/587 |
| 7,140,293 | B1 * | 11/2006 | Rotole et al. | 100/34 |
| 7,478,591 | B2 | 1/2009 | Kendrick et al. | |

FOREIGN PATENT DOCUMENTS

DE    10 2007 018 560    10/2008
WO    2007/136410    11/2007

* cited by examiner

*Primary Examiner* — Jimmy T Nguyen
(74) *Attorney, Agent, or Firm* — Michael J. Striker

(57) ABSTRACT

A baler is formed with a bale chamber for compressing agricultural crop into bales, at least one knotter for knotting twine wrapped around a finished bale and a twine store having at least one magazine in which the twine rolls for supplying the knotter are accommodated with axes lying on a common line.

7 Claims, 3 Drawing Sheets

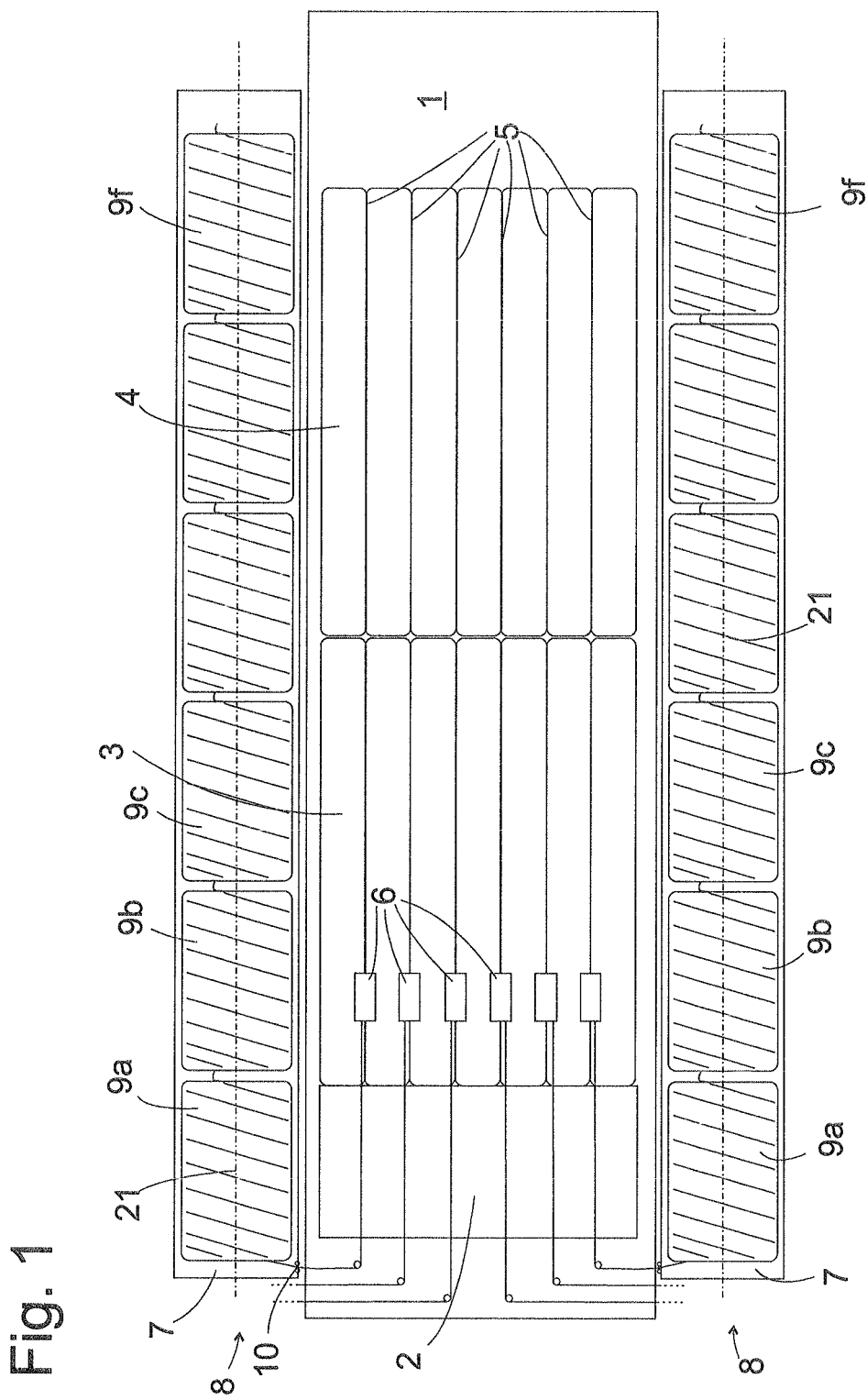

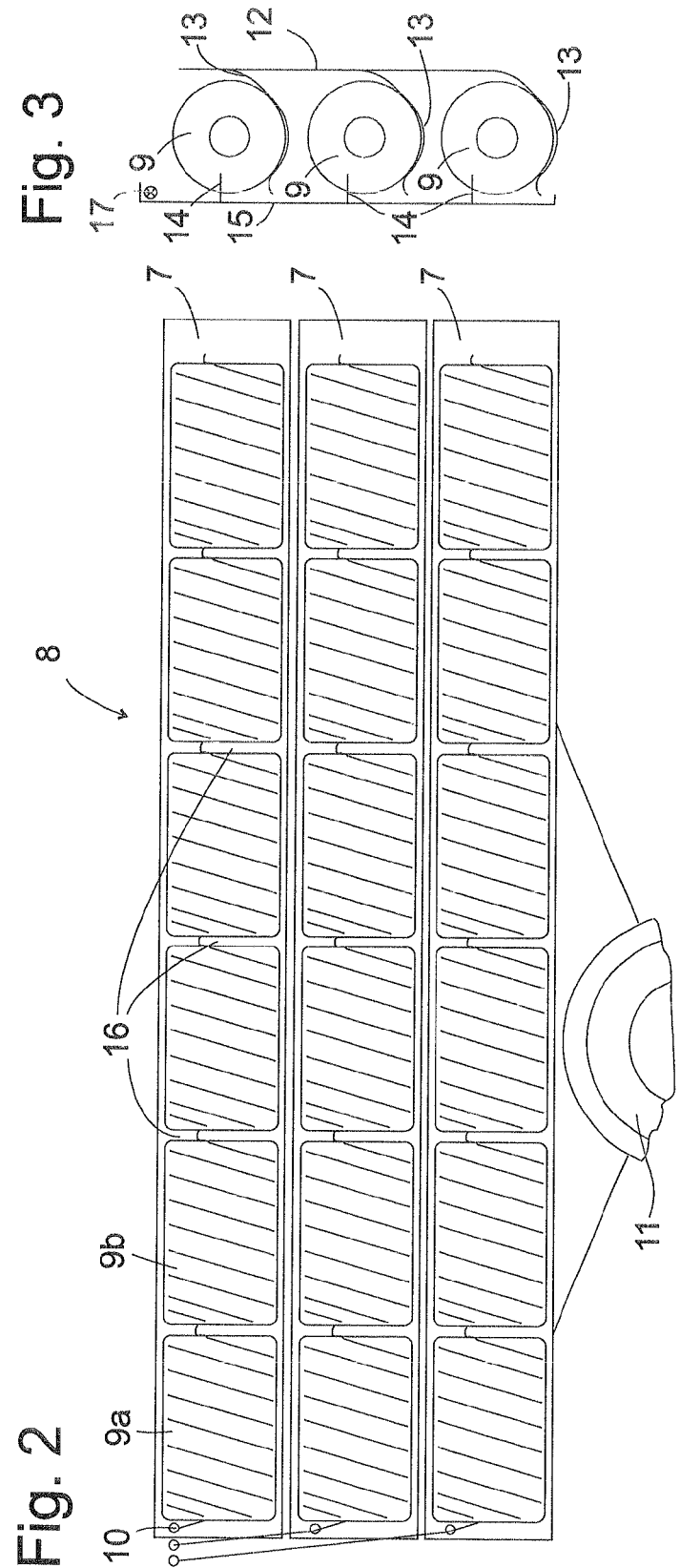

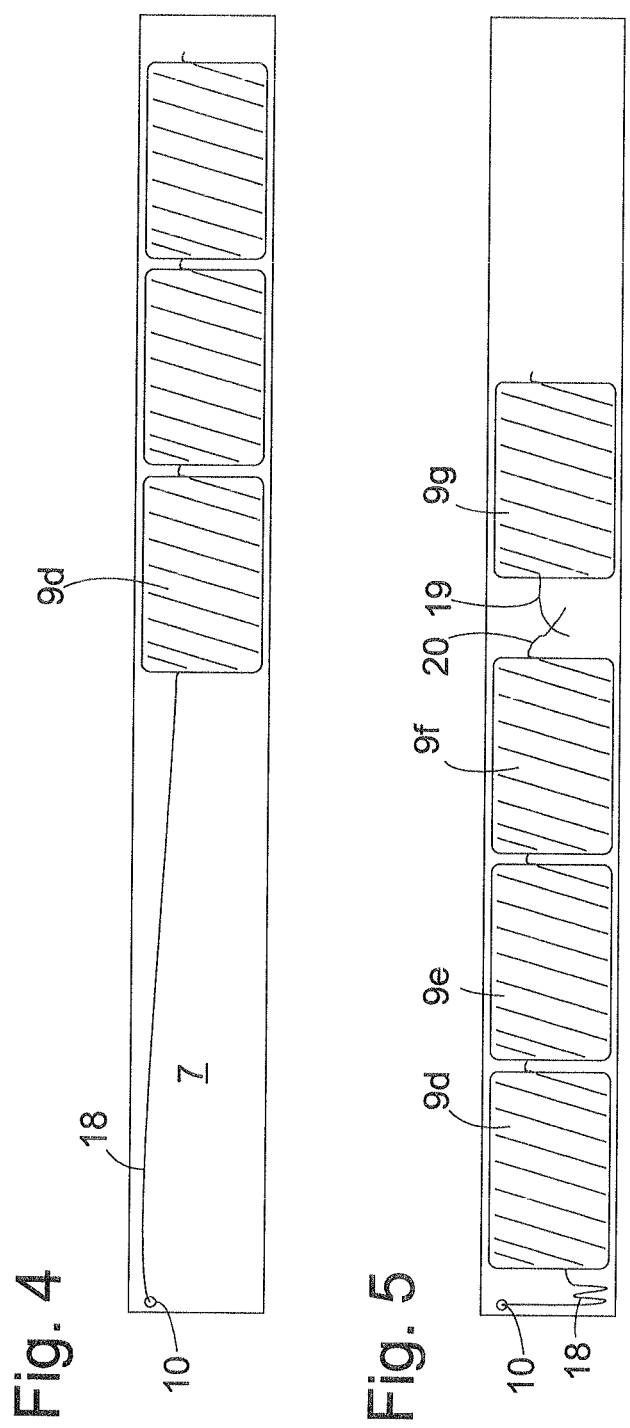

BALER

CROSS-REFERENCE TO A RELATED APPLICATION

The invention described and claimed hereinbelow is also described in German Patent Application DE 10 2012 002796.6, filed on Feb. 15, 2012. This German Patent Application, subject matter of which is incorporated herein by reference, provides the basis for a claim of priority of invention under 35 U.S.C. 119(a)-(d).

BACKGROUND OF THE INVENTION

The invention relates to a baler for compressing agricultural crop into bales. Balers are commonly found in substantially two designs, i.e., round balers and block balers. In round balers, continuously supplied crop is rolled up in a bale chamber to form a cylindrical bale and is compressed by the pressure of externally circulating belts. Block balers comprise a bale chamber in the form of an elongated channel, in which a baling ram is moved back and forth in order to press crop (which is fed in batches), onto a cuboid bale being formed. In both types of balers, once the bale has reached a desired target size, the bale must be stabilized by being wrapped with binding material (which is usually twine), in order to prevent the bale from falling apart after ejection from the bale chamber.

To ensure that harvesting proceeds rapidly and cost-effectively, all the twine required for a harvesting operation should be carried with the baler as the stockpile. Document WO 2007/136410 A2 makes known a block baler that carries the twine stockpile thereof in magazines disposed next to the pressing channel. The magazines each comprise a bottom plate, on which the twine rolls are located. The bottom plate is folded in the manner of an accordion in the longitudinal direction of the press and slanting downward to a side wall adjoining the pressing channel. The axes of the twine rolls each extend parallel to the folds of the bottom plate, in the transverse direction of the pressing channel. In this manner, the twine rolls are secured against sliding or rolling away during the harvesting operation.

To permit uninterrupted operation, the twine rolls must be connected to one another so that, as soon as one roll has been used up, the beginning of the next roll is drawn into the pressing channel. Errors that occur in the interconnection of the twine rolls can cause the twine to become stuck, and an operator must access the twine magazine and eliminate a knot that formed there before the harvesting operation can continue.

WO 2007/136410 A2 shows, in FIG. 4, a twine store having 15 twine rolls in three magazines. The twine rolls are interconnected across magazines via two or three rolls each to form six strands. Since a mirror-image, second twine store is provided on the other side of the baler, it is assumed that the twelve twine strands in all are provided to be tied around each bale in pairs, forming six loops. If the twine is not used up completely in a harvesting operation, twelve partially-used twine rolls remain, which the user must relocate in order to reload the device and connect the twine rolls in the pattern shown in FIG. 4. Alternatively, the user must refill the emptied compartments and connect the beginnings of the twine rolls loaded there to the ends of the partially-used twine rolls. The resultant criss-crossing paths of the twine strands to the knotters of the pressing channel, however, considerably increase the risk that the twine strands will become tangled in the storage area and that the supply of twine to the knotters will become disrupted.

The number of partially-used twine rolls that remains after a harvesting operation could be reduced by replacing the use of a double knotter. A double knotter connects two separately fed twine strands to form a loop, with the use of a single knotter, which is described in DE 10 2007 018 560 A1. The single knotter knots a single twine strand wrapped around the bale to form a loop. In order to supply such a single knotter, however, more than the two or three twine rolls shown in the aforementioned FIG. 4 would have to be interconnected. Hence, the problem remains that, during reloading, the twine rolls that are still present must be relocated, or the possibility of tangling occurring must be accepted.

SUMMARY OF THE INVENTION

The present invention overcomes the shortcomings of known arts, such as those mentioned above.

In an embodiment, the invention provides a baler that can be reloaded easily and safely, even if the twine supply was not used up completely in a previous harvesting operation.

The baler comprises a bale chamber for compressing agricultural crop into bales, at least one knotter for knotting twine wrapped around a finished bale and a twine store. The twine store accommodates twine rolls for supplying the knotter. In more detail, the twine store comprises at least one magazine, in which the twine rolls are accommodated with axes lying on a common line. These twine rolls can be easily interconnected, wherein the risk of connecting errors occurring (which could result in the twine becoming tangled) is minimized by interconnecting the rolls one after the other in the magazine.

The baler is preferably a block baler having an elongated pressing channel.

In such a block baler, the axis of the twine rolls preferably extends in the longitudinal direction of the pressing channel, thereby saving space.

If the twine rolls are supported such that these are displaceable along the axis, the space that becomes available when one twine roll is used up can be refilled by sliding forward the twine rolls that are still present. Accordingly, space that becomes available at one end of the magazine is filled with fresh twine rolls. Therefore, the twine rolls can always be interconnected one after the other, whereby the risk of various twine strands becoming tangled or, of errors occurring in the interconnection of the twine rolls, is minimized.

The magazine can advantageously comprise a trough in order to accommodate the twine rolls securely and in an easily displaced manner.

Double and single knotters also are possible for use as the knotters, in accordance with the invention.

The knotter is preferably a single knotter, thereby ensuring that a single strand of interconnected twine rolls suffices for supplying the knotter.

In order to supply a plurality of knotters, the twine store preferably comprises a plurality of magazines.

BRIEF DESCRIPTION OF THE DRAWINGS

Further features and advantages of the invention will become apparent from the description of embodiments that follows, with reference to the attached figures, wherein:

FIG. 1 shows a schematic top view of a baler according to the invention;

FIG. 2 shows a side view of the baler;

FIG. 3 shows a view of a twine store of the baler from behind;

FIG. 4 shows a partially emptied magazine of the twine store; and

FIG. 5 shows the magazine during reloading.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 depicts a baler according to the invention in a highly schematic top view. Located in the pressing channel 1 are a baling ram 2 (which can move back and forth in the direction of travel), a bale 3 (which is being formed) and a finished bale 4. The bales 3, 4 are each held together by a plurality of twine loops 5, namely six loops in this case.

The same number of knotters 6 is disposed above the pressing channel, wherein, when the bale 3 has reached a target size, the knotters knot the twine strands wrapped around the bale to form a fixed loop 5. Suitable knotters are described substantially in the technical literature and so there is no need to explain the design thereof here. Dedicated to each knotter 6 is a magazine 7 in one of two twine stores 8 arranged in a mirror image on either side of the baling ram. The magazine contains the twine required for the operation of the knotter 6.

Each of the magazines 7 holds a plurality of twine rolls 9, the longitudinal axes 21 of which are aligned parallel to the longitudinal direction of the pressing channel 1. The twine rolls 9 are hollow, without a core. A front end of the twine roll 9a closest to the baling ram 2 is drawn out of the inner hollow space of this twine roll 9a and is fed via eyelets 10 or similar guide means to one of the knotters 6. A back end, which is located on the outer side of this twine roll 9a, is knotted with the front end drawn out of the hollow space of the twine roll 9b that follows in the direction of travel. The twine rolls lined up in the magazine 7 therefore form a single, interconnected strand of twine. This ensures uninterrupted operation of the baler until the twine roll 9f located furthest to the rear in the direction of travel is used up.

It should be clear to the reader that the number of six twine rolls 9 per magazine 7 (as shown) is simply presented for exemplary purposes, and that deviating numbers can result depending on the installation space available in the magazine 7 and on the dimensions of the twine rolls 9.

Six magazines 7 are required in order to supply the six knotters 6 in all, each twine store 8 comprising three of these magazines. As shown in FIG. 2, the magazines 7 of a twine store 8 are disposed one above the other and above a wheel 11 of the baler. The arrangement of the twine rolls 9 is the same in every magazine. The twine roll 9a located furthest to the front in the direction of travel of the baler, i.e., the one on the left in FIGS. 1 and 2, is connected via eyelets 10 or the like to the particular assigned knotter 6. The outer end thereof is knotted with the inner end of the twine roll 9b following in the direction of travel.

FIG. 3 shows the magazine 7 on the left as viewed from the rear of the baler. Three troughs 13 extend from an inner wall 12 facing the pressing channel. Each of the troughs accommodates the twine rolls 9 of a magazine. The troughs 13 can be oriented horizontally in the longitudinal direction of the vehicle. This ensures that vibrations occurring during operation do not cause directional motion of the rolls in the magazine 7.

It also is feasible to secure the twine rolls 9 against possible shifting during operation, for example, via fingers 14 that engage from a cap 15 of the twine store 8 into the interior thereof and into intermediate spaces 16 (see FIG. 2) between the twine rolls 9 accommodated therein. These fingers 14 secure the twine rolls 9 from moving along the troughs 13, provided that the cap 15 is closed. Bit if the cap is swiveled upward about an axis 17 extending in the longitudinal direction of the baler to permit loading of the twine store 8, the fingers 14 also are withdrawn from the intermediate spaces 16. Consequently, a user can displace the twine rolls 9 in the troughs 13 if necessary.

FIG. 4 shows a side view of a magazine 7 after a harvesting operation. Of the rolls 9 that were originally loaded, the first three have been used up. The fourth, which is labeled as 9d, has been started. One strand 18 of the twine extends freely through the empty front half of the magazine 7 to the eyelet 10. Loading new twine rolls in this free region would obviously hinder the dispensing of twine from the roll 9d.

The baler is easily operated further without unloading the twine rolls that are still present in that the twine rolls are shifted toward the front end of the magazine 7, as shown in FIG. 5. A new twine roll 9g is loaded into the back half of the magazine, which is now free. The front end 19 is withdrawn from the inner hollow space of the roll and is connected to the back end 20 of the roll 9f, which was already placed furthest to the rear. This procedure is repeated until the magazine 7 has been completely filled once more. Consequently, the baler is ready for a new harvesting operation.

The following list of reference signs of various elements mentioned above is included (as follows), for ease of explanation:

REFERENCE CHARACTERS 1 pressing channel
2 baling ram
3 bale
4 bale
5 twine loop
6 knotter
7 magazine
8 twine store
9 twine roll
10 eyelet
11 wheel
12 inner wall
13 trough
14 finger
15 cap
16 intermediate space
17 axis
18 strand
19 front end
20 back end
21 axis As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A baler, comprising:
   a bale chamber embodying a pressing channel (1), the pressing channel (1) including a top, a bottom and opposing left and right sides and a bailing ram (2) positioned in the pressing channel (1) for compressing agricultural crop into bales (3, 4);
   at least one knotter (6) configured to knot twine wrapped around a finished bale (4); and
   two twine stores (8) that are positioned respectively on the opposing left and right sides of the pressing channel (1);
   wherein each of the twine stores (8) includes at least one magazine (7);
   wherein the at least one magazine (7) is dedicated to one at least one knotter (6) and includes a plurality of twine rolls (9) configured with longitudinal axes (21);
   wherein the twine rolls (9) supply the one at least one knotter (6);
   wherein the at least one magazine (7) comprises a trough (13) in which the twine rolls (9) are positioned;
   wherein the longitudinal axes (21) of the twine rolls (9) in the trough (13) of the at least one magazine (7) extend in a longitudinal direction of the pressing channel (1);
   wherein the twine rolls (9) are supported in each trough (13) of the at least one magazine (7) to be displaceable in the trough along the longitudinal direction of the pressing channel (1); and
   wherein the longitudinal axes (21) of the twine rolls (9) are collinear.

2. The baler according to claim 1, wherein the at least one knotter (6) is a single knotter.

3. The baler according to claim 1, wherein the twine stores (8) comprise a plurality of magazines (7), wherein the at least one knotter comprises a plurality of knotters (6) and wherein each of the plurality of magazines supplies one of each of the plurality of knotters (6).

4. The baler according to claim 3, wherein the magazines (7) are disposed one above the other.

5. A baler, comprising:
   a bale chamber embodying a pressing channel (1) in which a bailing ram (2) is positioned for compressing agricultural crop into bales (3, 4), wherein the pressing channel (1) includes a top side, a bottom side and left and right opposing sides;
   at least two knotters (6) configured to knot twine wrapped around a finished bale (4); and
   first and second twine stores (8) positioned respectively on the left and the right opposing sides of the pressing channel (1);
   wherein each of the first and the second twine stores (8) comprises a magazine (7), which includes twine rolls (9) with longitudinal axes (21) for supplying a respective one of the at least two knotters (6);
   wherein each magazine (7) of the first and second twine stores (8) comprises a trough (13) in which the twine rolls (9) are positioned and supported in the trough so that the respective longitudinal axes (21) of each twine roll extend in a longitudinal direction of the pressing channel and are aligned; and
   wherein the twine rolls are displaceable within each trough in a direction that is collinear with the aligned longitudinal axes.

6. The baler according to claim 1, wherein as a twine roll is used up, a space becomes available at a front end of the magazine associated therewith, and wherein twine rolls still present in the magazine behind the space are shifted forward, including into the space.

7. The baler according to claim 5, wherein as a twine roll is used up, a space becomes available at a front end of the magazine associated therewith, and wherein twine rolls still present in the magazine behind the space are shifted forward, including into the space.

\* \* \* \* \*